July 23, 1957  A. ESPER  2,799,893
PATTY MOLDING MACHINE
Filed Jan. 12, 1956
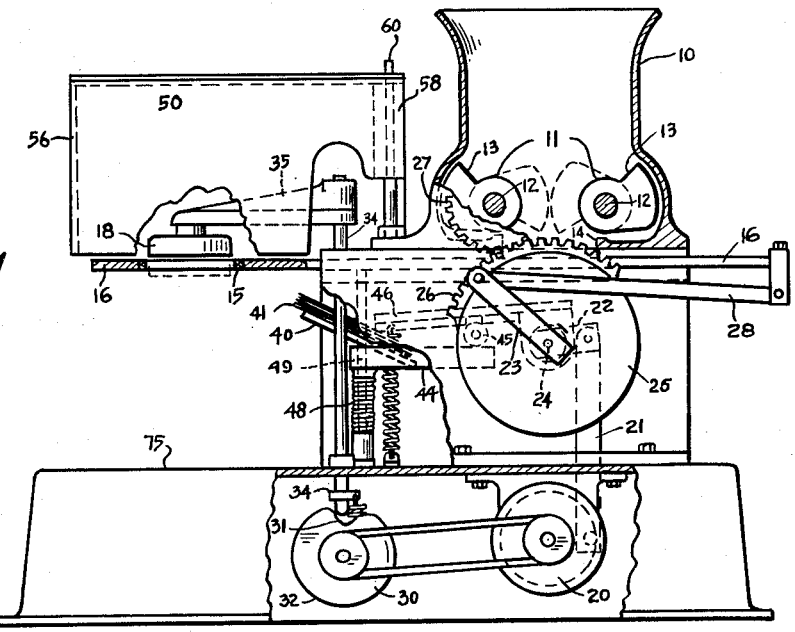
FIG. 1
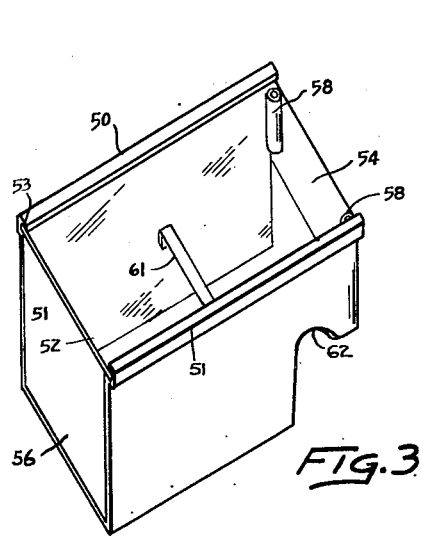
FIG. 2
FIG. 3
INVENTOR.
AMEN ESPER
BY
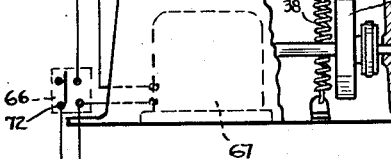
ATTORNEY United States Patent Office 2,799,893
Patented July 23, 1957

2,799,893

PATTY MOLDING MACHINE

Amen Esper, Worcester, Mass.

Application January 12, 1956, Serial No. 558,760

2 Claims. (Cl. 17—32)

This invention relates to a patty molding machine, and more particularly to apparatus which safeguards the machine operator from injury by the mechanism.

A patty molding machine of the types described in the patent to Holly #2,684,501 of July 27, 1954 and illustrated in the accompanying drawing comprises mechanism for molding meat into patties and depositing the same in a pile with separators therebetween. This construction comprises a reciprocable slide having an opening in which the patty is molded and then transported into contact with a separator sheet and ultimately to a position where a reciprocable plunger serves to eject the patty from the slide mold. In its operation, it is found that pieces of meat often escape from the mold space onto the slide. Instead of stopping the machine to clean off the slide, the operator sometimes attempts to catch the displaced meat with her finger and flip it from the moving slide. However, if this is attempted while the plunger is descending to remove the patty, it happens occasionally that the edge of the finger is caught between the ram and the mold plate with a consequent injury or even a loss of the finger.

The primary object of this invention is to provide a safety guard and associated mechanism which prevents the operator from contacting the reciprocable slide or plunger during the normal operation of the machine.

A further object is to provide a transparent safety housing which permits visual inspection of the operation as it proceeds but which prevents the operator from placing her hands in a position where they could be injured.

A still further object is to coordinate the safety housing with an electric switch mechanism which is so arranged that the housing may be readily removed to provide for cleaning off the slide mold plate but which opens the electric circuit so that the machine cannot be operated until the housing has been put back in its guarding position. Other objects will be apparent in the following disclosure.

Referring to the drawings illustrating one embodiment of the invention:

Fig. 1 is a fragmentary elevation, partly in section, of a patty molding machine;

Fig. 2 is an end elevation of the machine, partly broken away to show various features of the construction; and Fig. 3 is a perspective view of the protective housing.

The construction illustrated in the drawings and which may be made as more specifically described in said Holly patent, comprises a hopper 10 into which ground meat may be fed. At the lower part of the hopper are two rotary reciprocable feeders 11 mounted on suitable shafts 12 which are rotatably oscillated from the full line positions of Fig. 1 to the dotted positions so that their forward flat radially arranged faces 13 may crowd the meat downwardly through an opening 14 into a circular molding space within a mold ring 15 arranged in a reciprocable slide plate 16. The slide plate 16 is reciprocated from a position where the mold ring 15 will receive the material fed from the hopper 10 to the left hand position illustrated in Fig. 1 where a reciprocable hollow cup-shaped ram or plunger 18 serves to press the patty downwardly from the ring onto a shelf therebeneath.

A motor in the base drives a speed reduction mechanism carrying a plate 20 keyed on its shaft which is connected through a pitman 21 and a short link 22 connected to and adapted to rock a further lever 23 which is fixed to the shaft 24. The shaft carries a plate 25 having on its periphery a gear segment 26 which meshes with gears 27 fixed to the shafts 12 of the meat feeders 11, so that as the pitman rod 21 is reciprocated by the drive plate 20, the feeders will be oscillated to receive and crowd the meat into the mold of the slide plate 16. The reciprocable crank arm 23 is shown as connected through a link 28 and a suitable lost motion device with the slide plate 16 so that the slide plate may be moved between its two positions, as above stated. This construction may be made in accordance with the showing in said Holly patent, but it has been simplified herein for the sake of clarity of illustration.

The plunger 18 may be reciprocated by means of a cam plate 30 mounted on a shaft axially parallel with and belt connected to the shaft of the plate 20. The cam plate 30 has a deep notch 31 therein and a generally cylindrical peripheral portion 32. A reciprocable slide rod 34 suitably mounted in slideways in the machine base carries at its upper end an arm 35 on which the plunger 18 is mounted. A suitable tension spring 38 (Fig. 2) connected between the base and an arm on the rod 34, is arranged to move the plunger 18 downwardly when permitted by the cam follower rod 34 riding into the notch 31 of the cam plate 32. These various parts are so timed that the plunger 18 is reciprocated to remove the meat patty at the exact time when the mold 15 is properly located therebeneath.

Other features of the construction, which may be made in accordance with the patent, comprise the reciprocable support 40 carrying a set of paraffin coated paper strips 41, which is reciprocable from a lower position, as illustrated, to an uppermost position at which the meat patty moving toward the left (Fig. 1) will contact with the top one of the strips of paper and by adhesion withdraw it from the stack so that when the patty is forced from the mold by the plunger 18, a piece of paper will be adhering to the under face of the patty, and the various patties may be piled therebeneath with the paper separators 41 therebetween. This paper feeding mechanism may be made as shown in said patent. It is here illustrated as comprising a plate 44 mounted for vertical reciprocation on a slide rod and which is moved by means of a cam roller 45 on the under side of the rocking plate 46 fixed on the shaft 24. The plate 46 is rocked in synchronism with the movement of the oscillating shaft 24. It is urged towards an uppermost position by a spring 48 beneath the plate and carried on the rod 49 on which the plate is slidably mounted.

The spring 48 serves to thrust the paper pack 41 upwardly to its limit of travel and thus contact the meat patty moving toward the left, when the rocking plate 46 contacting the uppermost paper sheet 41 is permitted to move upawrdly by the cam roller 45. That plate 46 contacts the top of the paper pile and holds it properly positioned, while permitting the top sheet to be withdrawn by adhesion to the patty.

The primary feature of my invention comprises a housing 50 having two parallel spaced sides 51 transparent or opaque but which is particularly provided with a transparent plate 52 of glass or a suitable polymeric material which may be slidably mounted in two inwardly facing grooves 53 provided by shaping the side plates 51 accordingly. The housing is a box like structure open at the bottom and the rear, but having its sides 51 connected by a narrow cross plate 54 at the rear and by the front plate 56 extending the full distance downwardly of the sides so as to prevent access normally to its interior.

The housing 50 is sufficiently large and shaped and is so mounted on the machine that the sliding plate 16 can move therebeneath but cannot be readily contacted by the machine operator. To this end, the housing is provided with two vertical sleeves 58 near its opposite rear corners which are adapted to be slidably mounted on the parallel posts 60 projecting upwardly from the machine base. These posts and the associated side walls of the housing provide the necessary strength and rigidity to hold the housing in place. Also, a cross rod or strut 61 may be suitably secured, as by welding, between the two side walls 51 to give further strength. The side walls 51 are cut out at 62 near their rear portions to provide for assembly around projecting parts of the machine. The main feature lies in the fact that this housing 50 stands above and sufficiently spaced from and around the slide plate 16 so that the latter cannot be readily contacted by the machine operator. If necessary, the side walls 51 may project well below that slide plate, although illustrated as located only above the same.

The electric motor which drives the pitman plate 20 and the cam plate 30 has its electric circuit provided with a switch so arranged that the machine operator may start and stop the machine. In accordance with my invention, a second switch is provided which prevents operation of the machine when the plate 16 is not guarded. The electric circuit illustrated diagrammatically in Fig. 2 comprises a power line having two suitable switches 65 and 66 in series with the electric motor 67 which is mounted on the base of the machine and connected to operate the various mechanisms. The switch 65 may be a standard microswitch mounted on the side of the machine, and it comprises a button or lever 68 which is normally spring urged to an open position. One of the side walls 51 of the housing 50 has a projecting arm 70 so positioned relative to the normally open switch that it holds the contact arm 68 down and the switch closed when the housing is in place. If for any reason the protective housing 50 is removed, the switch 65 will immediately open and thus break the circuit at this point. The switch 66 may be of the usual make and break type, so that the operator may throw the switch lever 72 either to open or to close the circuit to the motor 67. Since these two switches are in series, it is therefore required that both switches be closed before the machine can operate, so that if the operator removes the protective casing 50 for the purpose of cleaning off the slide, then the upper switch 65 automatically springs to an open position and thus insures that the circuit is broken and that the slide plate 16 and the plunger 18 cannot move during the cleaning operation.

The casing 50 is shaped to give the necessary guarding action and yet permit operation of the mechanisms therebeneath and at the same time not interfere with the normal inspection of the slide action and the withdrawal of the stack of meat patties therebeneath. The transparency of the protective casing, which may be made of wire mesh, serves various purposes, in that it permits the operator to watch the machine operation and to make sure that everything is going smoothly. The operator may remove the stack of meat patties from the shelf 75 without interference from the reciprocating slide and plunger because of the shape and mounting of the housing. She may stop the machine normally by means of the lower switch 72 and the safety features remain in place and require no attention on her part. Other advantages will be readily apparent.

It will now be appreciated that various modifications may be made in the construction and that the accompanying description of a preferred embodiment of the invention is not to be interpreted as imposing limitations on the accompanying claims.

I claim:

1. A patty molding machine comprising a machine frame, a reciprocable horizontal slide having a mold opening and movable outwardly from the frame to an accesible projecting position, means for feeding ground meat to the mold opening and forming a patty when the slide is in a non-projected position, a plunger movable to remove the patty to a position beneath the slide when the latter is in a projecting position, electrically operated mechanism including an electric circuit for operating the slide and plunger in a timed relation, a housing removably mounted on the machine frame and overhanging the slide and plunger which has a substantially transparent wall permitting inspection of the slide and plunger operation but protectively prevents access thereto, a normally open electric switch on the frame located near the housing and arranged in said circuit for controlling said mechanism, said housing having a part which engages and holds the normally open switch closed only when the housing is in a protective position, and a second machine control switch in series with said normally open switch which requires that both switches be closed to cause operation of the machine mechanism.

2. A machine according to claim 1 in which the machine frame has upwardly projecting posts and the housing has sleeves slidably and removably mounted on the posts for supporting the housing over the slide.

References Cited in the file of this patent

UNITED STATES PATENTS

| 1,724,598 | Johnston | Aug. 13, 1929 |
| 2,452,403 | Stukart | Oct. 26, 1948 |
| 2,508,460 | Latham | May 23, 1950 |
| 2,568,002 | Hart et al. | Sept. 18, 1951 |
| 2,684,501 | Holly | July 27, 1954 |